United States Patent [19]

Shelton

[11] Patent Number: 4,610,148

[45] Date of Patent: Sep. 9, 1986

[54] SOLID ADSORBENT HEAT PUMP SYSTEM

[76] Inventor: Samuel V. Shelton, 1183 Burnt Creek Ct., Decatur, Ga. 30033

[21] Appl. No.: 729,921

[22] Filed: May 3, 1985

[51] Int. Cl.$^4$ ............................................. F25B 17/08
[52] U.S. Cl. ......................................... 62/480; 62/106
[58] Field of Search ................. 62/101, 106, 480, 115, 62/118

[56] References Cited

U.S. PATENT DOCUMENTS

| | | | |
|---|---|---|---|
| 1,833,901 | 12/1931 | Hull | 62/480 X |
| 2,024,083 | 12/1935 | Young | 62/106 |
| 2,131,119 | 9/1938 | Root et al. | 62/106 |
| 3,828,566 | 8/1974 | Wetzel | 62/106 X |
| 4,183,227 | 1/1980 | Bouvin et al. | 62/480 |

Primary Examiner—Lloyd L. King
Attorney, Agent, or Firm—B. J. Powell

[57] ABSTRACT

A heat pump system with a pair of solid adsorbent beds connected to a heat pump loop and a reversible heat transfer loop. The heat pump loop has a heater connected between one end of the beds and a cooling heat exchanger connects the other end of the beds so that a heat transfer fluid flowing around the heat transfer loop heats one bed and cools the other with the flow being reversed to cycle the beds and drive the heat pump loop.

11 Claims, 13 Drawing Figures

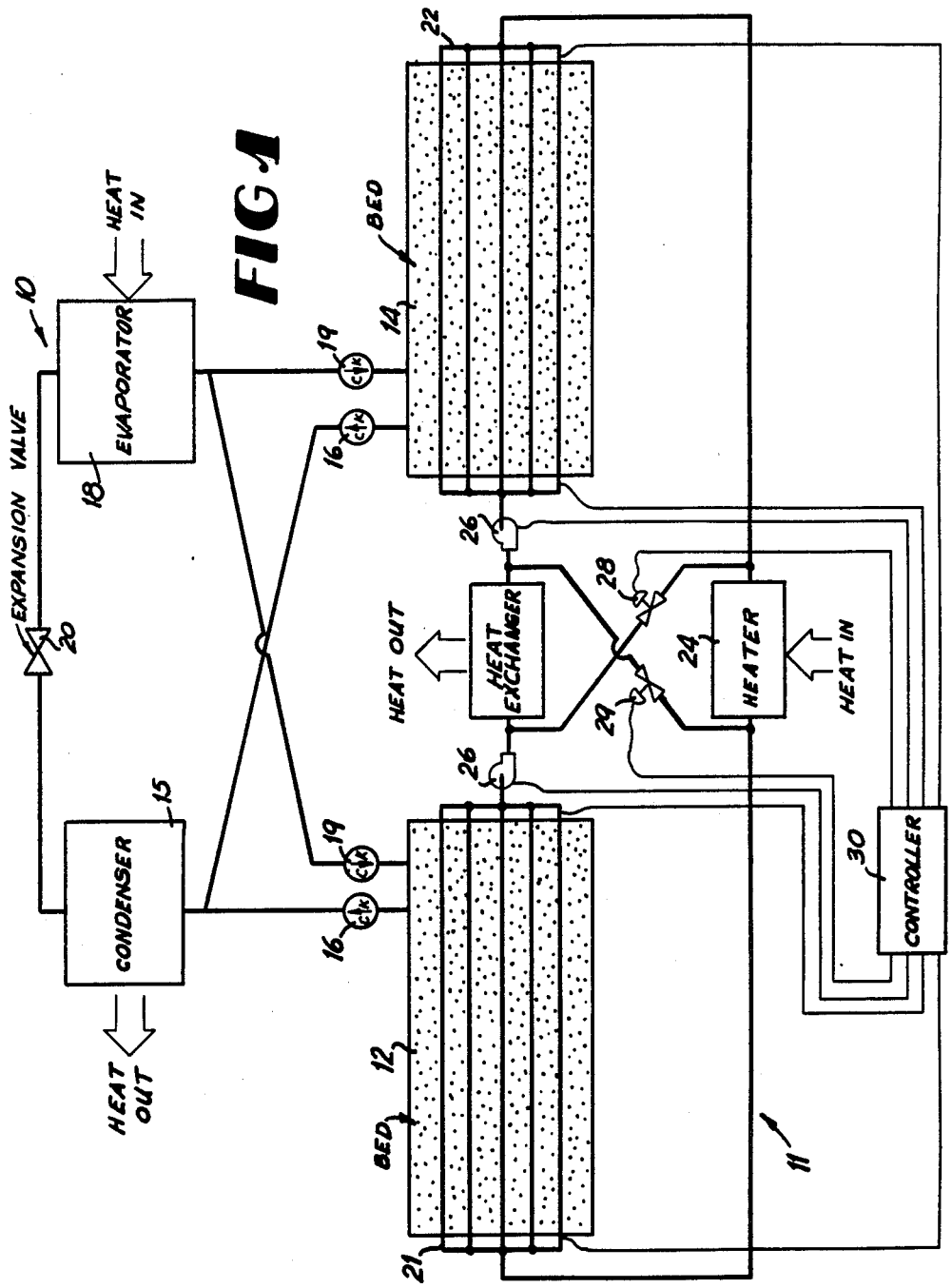

SOLID ADSORBENT HEAT PUMP SYSTEM

BACKGROUND OF THE INVENTION

This invention relates generally to heat pumps and more particularly to heat pumps which use beds of solid adsorbent to drive the heat pump loop in response to the heating and cooling of beds.

Heat driven heat pumps which use solid adsorbent beds to adsorb and desorb a refrigerant or known in the art. These solid adsorbent beds exhibit the phenomena of adsorbing and desorbing refrigerant vapor in response to the changes in the temperature of the adsorbent. One common example of such solid adsorbent material is molecular sieves, commonly known as zeolite. Other materials which exhibit this phenomena are silica gel, alumina and activated charcoal. Most any liquid which can be vaporized can be used as the refrigerant. Water is commonly used as a refrigerant with zeolite.

Because such beds desorb refrigerant vapor when heated and adsorb refrigerant vapor when cooled, they can be used to drive the refrigerant around a heat pump loop to heat or cool a desired space. In the heat pump loop the refrigerant is desorbed from the beds as it is heated to drive refrigerant out of the bed to a condenser to condense the vapor. The condensed refrigerant is then expanded through an expansion valve and passes to an evaporator where the refrigerant is again vaporized. When the bed is cooled, refrigerant vapor from the condenser is adsorbed into the bed to complete the cycle. Because a bed cannot readily adsorb and desorb refrigerant at the same time, two solid adsorbent beds are typically used with one being heated while the other is cooled. The heating and cooling steps are reversed when the beds are heated and cooled to the desired temperature limits during a cycle.

A number of different arrangements have been proposed for heating and cooling the beds of solid adsorbent. One common technique uses a heat transfer fluid with a heat exchange arrangement between the fluid and each solid adsorbent bed so that heat is exchanged between the heat transfer fluid and the bed as the heat transfer fluid is circulated through the heat transfer arrangement. The heat transfer fluid is also connected to an external cooling heat exchanger to cool the fluid and an external heater to heat the fluid. The heat transfer loop may be operated in two different ways. One way is to circulate part of the heat transfer fluid heated by the heater through the bed to be heated and then directly back to the heater for reheating while circulating another part of the heat transfer fluid cooled by the cooling heat exchanger through the bed to be cooled and then directly back to the cooling heat exchanger. Another way is to circulate the heated heat transfer fluid from the heater through the bed being heated, then through the cooling heat exchanger to finish cooling the heat transfer fluid, then through the bed being cooled, and finally back to the heater to finish heating the heat transfer fluid. Such an arrangement is illustrated in U.S. Pat. No. 4,183,227 issued Jan. 15, 1980 to J. Bouvin, et al.

None of these prior art systems suggests any particular method of operation therefor except that the beds are simply heated or cooled until the entire bed has reached the end temperature limits of the cycle step. Good engineering practice suggests that the average heat transfer rate between the heat transfer fluid and the bed be kept as high as possible. This suggests that heat should be transferred between the fluid and bed at all times while the fluid and bed are in a heat transfer relationship with each other. As a result, temperature gradients lengthwise of the bed are to be avoided. Using this criteria, the heating coefficient of performance (COP) is typically on the order of 1–1.5 while the cooling COP is typically on the order of 0.1–0.5. The system performance based on this operation has not been able to economically compete with mechanical compressor heat pump systems.

SUMMARY OF THE INVENTION

These and other problems and disadvantages associated with the prior art are overcome by the invention disclosed herein by providing a method of operating a solid adsorbent, heat driven heat pump system so that the coefficient of performance (COP) thereof is greatly increased over prior art operating methods so as to economically compete with mechanical compressor heat pump systems. The method of the invention operates contra to good engineering practice in that a temperature gradient is established lengthwise of the solid adsorbent bed to establish a thermal wave in the bed moving axially thereof. Preferably, substantially all the heat is transferred at the wave front rather than along the entire length of the bed. Using this criteria, heating coefficient of performances (COP) on the order of 2.5–3.0 and cooling COP on the order of 1.5–2.0 are achieved.

During operation, one of the solid adsorbent beds is being cooled while the other bed is being heated with the heating and cooling cycle steps being reversed so that both beds are heated and then cooled during a cycle. The heat exchange arrangement includes a heat exchanger associated with each bed that allows the heat transfer fluid to move generally axially through the solid adsorbent bed in a single pass. The cooling heat exchanger is connected between one end of the bed heat exchangers while the heater is connected between the other ends of the bed heat exchangers. A reversible pumping means circulates the heat transfer fluid in either direction around the circuit. Thus, the heat transfer fluid always flows serially from the heater through one of the bed heat exchangers to heat that bed while cooling the heat transfer fluid, then through the cooling heat exchanger to further cool the heat transfer fluid, then through the other bed heat exchanger to cool that bed while heating the heat transfer fluid, and finally back to the heater to be heated back to the initial temperature. This cycles both beds between the upper and lower operating temperatures selected for the system. The heat transfer fluid flow rate and bed heat exchanger design are selected to establish the thermal waves in the beds. The heater heats the heat transfer fluid to the upper operating temperature while the cooling heat exchanger cools the heat transfer fluid to the lower operating temperature. As the hot heat transfer fluid passes through the cooler bed heat exchanger, it is cooled to the bed temperature well before it reaches the exit end of the bed so that the exiting heat transfer fluid is at the initial cool bed temperature. As the thermal wave moves lengthwise of the bed, the temperature of the heat transfer fluid exiting the bed remains at the initial cool bed temperature until the thermal wave reaches the exit end of the bed. The cooling heat exchanger then cools the already cooled heat transfer fluid down to the lower operating temperature for the system. As the cold heat transfer fluid passes through the hotter bed heat exchanger, it is heated to the bed temperature well before it reaches the exit end of the bed so that the exiting heat transfer fluid is at the initial hot bed temperature. As the thermal wave moves lengthwise of the bed, the temperature of the heat transfer fluid exiting the bed remains at the initial hot bed temperature until the thermal wave reaches the exit end of the bed. The heater then reheats the heat transfer fluid back to the upper operating temperature for recycling. When the thermal waves reach the exit ends of the beds, the flow of the heat transfer fluid is reversed so that the heated bed is cooled and the cooled bed is heated.

To achieve a thermal wave, it is necessary that the desired bed temperature differential along its length be achieved within a distance less than the bed length. Preferably, the wavelength should be as short as possible. It has been determined that the key correlating parameter for wave length is the fluid Peclet number divided by one plus the bed/fluid thermal conductance ratio. Further, it has been found that a thermal wave will be produced when this wavelength parameter is greater than one but less than the bed Biot number. The optimum value of this wavelength parameter which produces the shortest thermal wavelength has been found to be the square root of the bed Biot number.

These and other features and advantages of the invention will become more apparent upon consideration of the following description and accompanying drawings wherein like characters of reference designate corresponding parts throughout the several views and in which:

These figures and the following detailed description disclose specific embodiments of the invention, however, the inventive concept is not limited thereto since it may be embodied in other forms.

DETAILED DESCRIPTION OF ILLUSTRATIVE EMBODIMENTS

Figures 1, 4A:
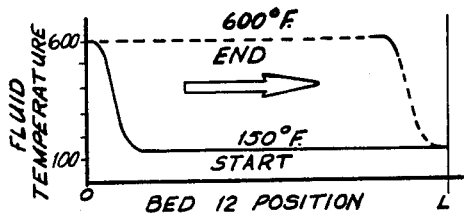
FIG. 1 is a schematic drawing illustrating the apparatus of the invention.
FIGS. 4A-4D illustrate the temperature profiles during operation of the apparatus of FIG. 1.
Figures 2, 4A:
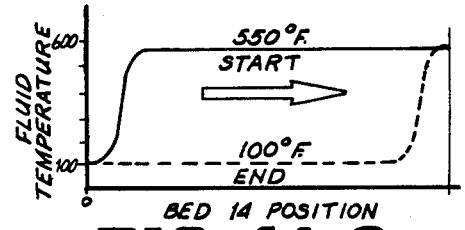

Referring to FIG. 1 it will be seen that the apparatus for practicing the invention includes a heat pump loop 10 and a heat transfer loop 11. The heat pump loop 10 includes a pair of solid adsorbent beds 12 and 14, a condenser 15 connected to both of the beds 12 and 14 in parallel through check valves 16 that allow refrigerant vapor to flow only from the beds 12 and 14 to the condenser, an evaporator 18 connected to both of the beds 12 and 14 through check valves 19 that allow refrigerant vapor to flow only from the evaporator into the beds, and an expansion valve 20 connecting the condenser and evaporator to allow the refrigerant to flow from the condenser to the evaporator. While one of the beds 12 and 14 is heated, the other is cooled so that refrigerant vapor desorbed from the bed being heated flows to the condenser 15 while refrigerant vapor from the evaporator 18 flows to the bed being cooled to be adsorbed therein.

The heat transfer loop 11 includes a pair of bed heat exchangers 21 and 22 respectively associated with the beds 12 and 14 to place a heat transfer fluid in a heat exchange relation with the beds 12 and 14. A heater 24 connects the heat exchangers 21 and 22 between one end of the beds 12 and 14 while a cooling heat exchanger 25 connects the heat exchangers 21 and 22 between the other ends of the beds. One or more pumps 26 are provided for pumping the heat transfer fluid around the heat transfer loop in either direction. A modulating bypass valve 28 connects the common point in loop 11 between the bed heat exchanger 21 and the cooling heat exchanger 25 with the common point between the heater 24 and the bed heat exchanger 22. A similar modulating bypass valve 29 connects the common point in loop 11 between the bed heat exchanger 22 and cooling heat exchanger 25 with the common point between heater 24 and the bed heat exchanger 21. A controller 30 is provided for operating pumps 26 and valves 28 and 29. The controller 30 has temperature pickups at the opposite ends of the beds 12 and 14 to monitor the fluid temperature of the heat transfer fluid as it exits the beds. As will become more apparent, the controller 30 controls the pumps 26 and the valves 28 and 29 in response to the exit fluid temperature to reverse the flow of heat transfer fluid around the heat transfer loop 11 and to control the amount of heat transfer fluid that will bypass one of the beds.

The solid adsorbent material used in the beds 12 and 14 may be any such material which adsorbs and desorbs a refrigerant vapor. One material commonly used is natural or synthetic zeolite or molecular sieves and will be used in the example disclosed herein. Any liquid which vaporizes over the pressure and temperature range available in the system may be used as the refrigerant. A convenient liquid is water and will be used as the refrigerant in the example disclosed herein. The specific solid adsorbent and refrigerant disclosed, however, is not meant to be limiting.

Figure 2:
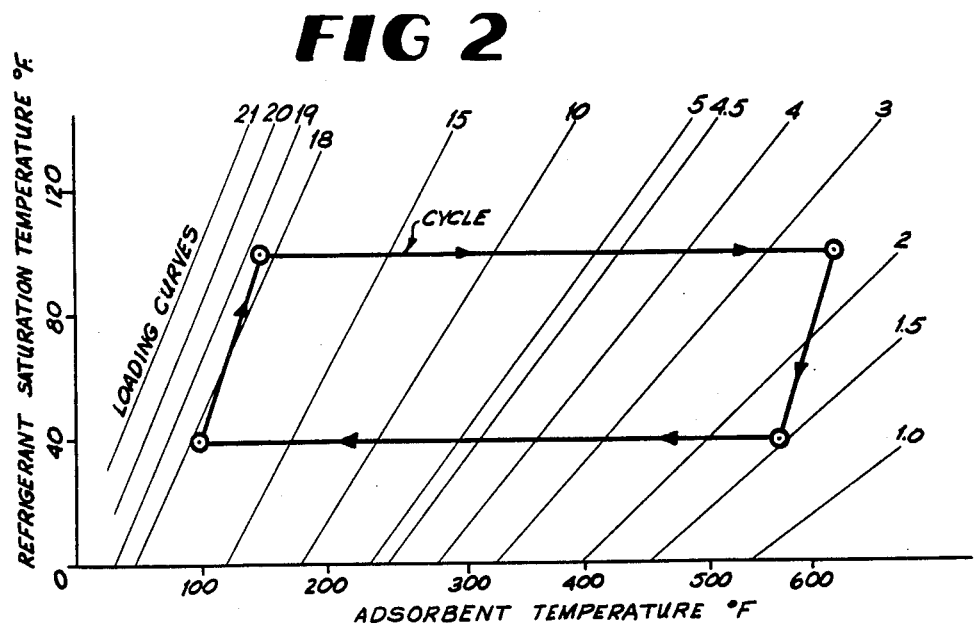
FIG. 2 is a chart illustrating the solid adsorbent operating cycle.

FIG. 2 is a chart showing the water adsorption characteristics of a commercially available zeolite from Union Carbide designated as "Molecular Sieve Type 5A". Other zeolites would have similar characteristics. The loading curves shown in FIG. 2 are expressed in terms of pounds of adsorbed water vapor per one hundred pounds of zeolite. Using a typical condensing temperature of about 100° F. and evaporating temperature of about 40° F., it will be seen that the zeolite will absorb about 18 pounds of water vapor/100 pounds of zeolite when the zeolite is cooled to about 100° F. and will desorb the vapor down to about 2 pounds water vapor/100 pounds zeolite when the zeolite is heated to about 600° F. These temperatures are selected for the system operating example disclosed herein but are not meant to be limiting. The operating cycle of the bulk of each adsorbent bed 12 and 14 has been superimposed on the loading curves of FIG. 2. As the bed is cooled from about 550° F. to 100° F. at evaporator pressure the water vapor loading is increased from about 1.5 pounds to about 17.5 pounds. When the bed is adiabatically pressurized until condenser pressure is reached, the water vapor loading is initially increased to about 18.5 pounds. As the bed is heated from about 150° F. to 600°

F. at condenser pressure, water vpaor loading is decreased from about 18.5 pounds to about 2.5 pounds. As the bed is adiabatically depressurized until evaporator pressure is reached, the water vapor loading is reduced to about 1.5 pounds. The cycle is then repeated. Thus, it will be seen that each bed will be cooled to adsorb water vapor at constant evaporator pressure and temperature; then pressurized to condenser pressure; then heated to desorb water vapor at constant condenser pressure and temperature; and finally depressurized back to evaporator pressure.

Heat is transferred into the heat transfer fluid by the heater 24 and is transferred out of the heat transfer fluid by the cooling heat exchanger 25 with a low coefficient of performance. On the other hand, heat is transferred by the condenser 15 and evaporator 18 with a high coefficient of performance. Therefore, minimizing the heat transferred by the heater 24 and heat exchanger 25 and maximizing the heat transferred by the condenser 15 and evaporator 18 serves to maximize the overall COP of the system. The method of the invention disclosed therein minimizes the temperature drop across both the cooling heat exchanger 25 and the temperature rise across heater 24 while still being able to cycle the beds between the upper and lower temperatures required to operate the system.

As was explained, one of the beds 12 or 14 is being heated while the other bed 12 or 14 is being cooled. After one bed has been heated and the other bed cooled, the fluid flow is reversed so that the heated bed is cooled and the cooled bed is heated. Each is heated to the desired upper operating temperature at condenser pressure and is cooled to the desired lower operating temperature at evaporator pressure. As will become more apparent, reversing the fluid flow serves to initially adiabatically depressurize the bulk of the hot bed down to evaporator pressure and adiabatically pressurize the bulk of the cool bed up to condenser pressure. This results in the temperature of the bulk of the hot bed being lowered to an intermediate upper temperature during this initial depressurization while the temperature of the bulk of the cool bed is raised to an intermediate lower temperature during this initial pressurization. Thus, in the example illustrated in FIG. 2, the upper temperature of 600° F. at condenser pressure is lowered to an intermediate upper temperature of about 550° F. at evaporator pressure while the lower temperature of 100° F. at evaporator pressure is raised to an intermediate lower temperature of about 150° F. at condenser pressure when the cycle is reversed.

From the foregoing, it will be seen that the fluid temperature entering the bed being heated must be at least as high as the desired upper operating temperature and that the fluid temperature entering the bed being cooled must be at least as low as the desired lower operating temperature. The method of the invention maintains the minimum temperature drop across the cooling heat exchanger 25 by keeping the temperature of the fluid entering same from the bed being heated at the intermediate lower temperature while maintaining the minimum temperature rise across the heater 24 by keeping the temperature of the fluid entering same from the bed being cooled at the intermediate upper temperature.

To keep the temperature of the heat transfer fluid exiting the bed being heated at the intermediate lower temperature and the temperature of the heat transfer fluid exiting the bed being cooled at the intermediate upper temperature, a thermal wave is established within each bed which travels lengthwise of the bed as it is heated or cooled. The thermal wave in the bed being heated has a temperature differential thereacross from the upper temperature to the intermediate lower temperature while the thermal wave in the bed being cooled has a temperature differential thereacross from the lower temperature to the intermediate upper temperature. This, of course, requires that the beds 12 or 14 be capable of having a large temperature differential lengthwise of the bed.

In order to develop a thermal wave moving lengthwise of the beds 12 and 14, the heat exchangers 21 and 22 placing the heat transfer fluid in a heat exchange relationship with the beds move the heat transfer fluid in a single direction along the length of the bed. Typically the heat exchangers 21 and 22 are constructed of one or more tubes through which the heat transfer fluid passes and around which the solid adsorbent is held by a housing shell to transfer heat between the fluid and adsorbent.

Figure 3:
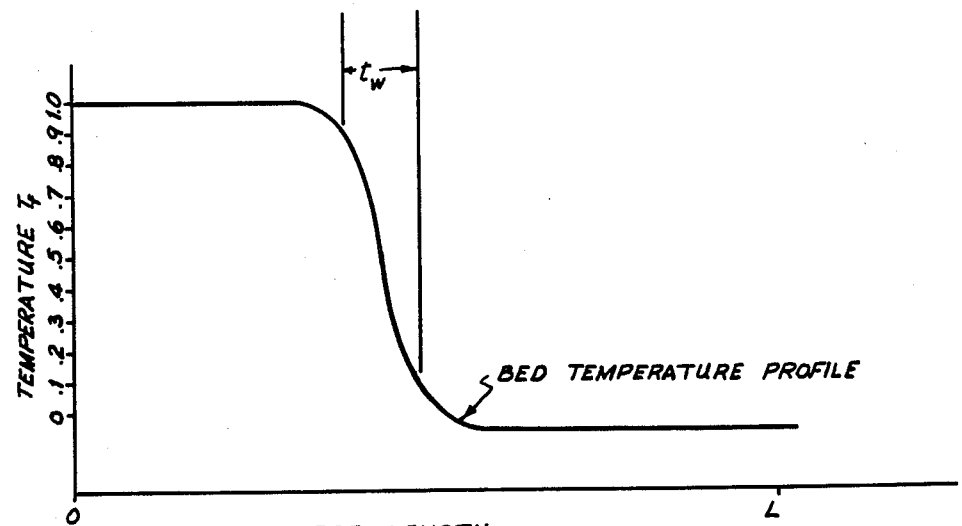
FIG. 3 is a diagram illustrating thermal wavelength.

To keep the temperature of the heat transfer fluid exiting the bed at the desired temperature, it is necessary to reverse the heating or cooling step when this temperature starts to raise above or drop below this desired temperature by a prescribed amount. To achieve a cycle time of any duration, it will be seen that the thermal wave must have a wavelength shorter than the length of the bed. As will become more apparent, some portion of each end of the bed will effectively not be utilized. The portions of the bed not being utilized will be minimized when the thermal wavelength is minimized. FIG. 3 illustrates the thermal wavelength tw as used herein as being the axial bed distance between the point where dimensionless fluid temperature $T_f=0.9$ to the point where $T_f=0.1$ and where:

$$T_f = \frac{t_b - t_i}{t_o - t_i} \tag{1}$$

$t_b$=bed temperature at a selected axial position
$t_i$=initial bed temperature at start of cycle
$t_o$=fluid temperature entering bed

OPERATION

The overall operating cycle of the system can be divided into four distinct process steps, Steps A–D. Step A is a heating/cooling step where one bed is being heated while the other bed is being cooled. Step B is a pressurization/depressurization step following Step A where the hot bed is depressurized to evaporator pressure while the cool bed is pressurized to condenser pressure. Step C follows Step B and is the reverse of Step A in that the bed which was heated in Step A is cooled and the bed that was cooled in Step A is heated. Step D follows Step C and is the reverse of Step B in that the bed pressurized in Step B is depressurized back to evaporator pressure and the bed depressurized in Step B is repressurized back to condenser pressure. These steps allow the cycle to be repeated between the upper and lower desired operating temperatures. It will also be appreciated that the driving force for carrying out the operating cycle is provided simply by heating and cooling the heat transfer fluid and controlling its circulation.

In the following discussion of the operating cycle, the refrigerant is water while the beds 12 and 14 are made of the zeolite described in FIG. 2 by way of example. It will be appreciated that similar operating cycles can be achieved using the different solid adsorbents and also using different refrigerants. For convenience, the following example of the operating cycle uses a lower temperature of 100° F. and an upper temperature of 600° F. between which the beds are cycled, however, it is to be understood that different temperature ranges can just as easily be used. Since one of the beds must be heated and the other bed cooled at the beginning of an operating cycle, the bed 12 has been selected as being initially cool and at condenser pressure while the bed 14 is selected to be initially hot and at evaporator pressure. Also, for simplicity, the cycle is described after the system has been operating sufficiently to reach steady state conditions.

In Step A, the bed 12 is to be heated while the bed 14 is to be cooled. The pump 26 is operated to force the heat transfer fluid around the heat transfer loop 11 in a clockwise direction as seen in FIG. 1 so that the heat transfer fluid flows from the heater 24 through the bed 12, then through the cooling heat exchanger 25, then through the bed 14 and finally back to the heater 24. The heater 24 always heats the heat transfer fluid to the upper operating temperature for the system. In the particular example, this temperature is 600° F. The cooling heat exchanger 25 always cools the heat transfer fluid to the lower temperature at which the system is to be operated. In the example, this lower temperature is 100° F.

FIG. 4A-1 illustrates the temperature profile in the cool bed 12 and FIG. 4A-2 illustrates the temperature profile in the hot bed 14 during Step A in the operating cycle. The temperature profile at the beginning of the cycle is illustrated in a solid line in FIGS. 4A-1 and 4A-2 while the temperature profile in the bed at the end of the cycle is illustrated in dashed lines in the figures. As was indicated above, the temperature profile at the beginning of the cycle assumes that the system has been operating until steady state conditions have been achieved. It will be noted that the temperature profile along the length of the bed will vary so that a thermal wave is left in the bed from the last cycle. The thermal wave will be located at the end of the particular bed from which the heat transfer fluid exited the bed during the last heating or cooling of the bed in the last cycle. In this example, the thermal wave is located in the left end of both of the beds 12 and 14 as seen in FIGS. 1 and 4A at the beginning of Step A. Preferably, the heat transfer fluid will flow into the bed from that end at which the thermal wave is located at the beginning of the process step. Thus, the heat transfer fluid flows into the left end of both of the beds 12 and 14 during Step A.

As the pump 26 pumps the heat transfer fluid from the heater 24 through the heat exchanger 21 in bed 12, the hot heat transfer fluid entering the left end of bed 12 as seen in FIG. 1 starts heating the bed up to 600° F. from its left end. As will become more apparent, the system operating parameters are selected so that the heat transfer fluid passing through bed 12 will be cooled down to the initial bed temperature of about 150° F. well before the heat transfer fluid reaches the opposite end of the bed. The cooled heat transfer fluid at about 150° F. then flows through the heat transfer coil 25 where it is cooled down to the lower operating temperature of about 100° F. The cold heat transfer fluid enters the left end of the bed 14 through its heat exchanger 22 as seen in FIG. 1 to start cooling the bed 14 down to about 100° F. from its left end. The system operating parameters are such that the heat transfer fluid passing through bed 14 will be heated up to the initial bed temperature of about 550° F. well before it reaches the opposite end of the bed. The reheated heat transfer fluid then flows back to heater 24 where it is reheated back to the upper operating temperature of about 600° F. and recirculated around the heat transfer loop.

As pump 26 continues to circulate the heat transfer fluid around loop 11 in the clockwise direction as seen in FIG. 1, the thermal wave in the temperature profile moves lengthwise of the beds 12 and 14 from the fluid inlet end toward the fluid exit end of the beds. In FIG. 1 these thermal waves move from the left to the right along the beds. As best seen in FIG. 4A-1, that portion of the bed 12 on the left side of the thermal wave therein is at about 600° F. while that portion of bed 12 on the right side of the thermal wave is at about 150° F. From FIG. 4A-2, that portion of the bed 14 on the left side of the thermal wave therein is at about 100° F. while that portion of bed 14 on the right side of the thermal wave is at about 550° F.

Since the bed 12 is at uniform condenser pressure during Step A, that portion of the bed 12 across which the thermal wave temperature difference is being imposed desorbs the refrigerant vapor from its initial high loading of about 18.5 pounds water vapor/100 pounds adsorbent at about 150° F. down to the lower loading of about 2.5 pounds of water vapor/100 pounds of adsorbent at about 600° F. That portion of the bed 12 on the right hand side of the thermal wave remains at the high loading while that portion of the bed on the left hand side of the thermal wave is at the lower loading. Thus, more and more of the water vapor in the bed 12 is desorbed as the thermal wave moves to the right and is expelled into the condenser.

Since the bed 14 is at uniform evaporator pressure during Step A, that portion of the bed 14 across which the thermal wave temperature difference is being imposed adsorbs the refrigerant vapor from its initial low loading of about 1.5 pounds water vapor/100 pounds adsorbent at about 550° F. up to the higher loading of about 17.5 pounds water vapor/100 pounds adsorbent at about 100° F. That portion of the bed 14 on the right hand side of the thermal wave remains at the low loading while that portion of the bed on the left hand side of the thermal wave is at the higher loading. Thus, more and more water vapor from the evaporator 18 is adsorbed in the bed 14 as the thermal wave moves to the right.

The pump 26 continues to circulate the heat transfer fluid clockwise around the heat transfer loop 11 until the thermal waves in beds 12 and 14 reach the right hand ends thereof as shown by the dashed line temperature profiles in FIGS. 4A-1 and 4A-2. This is usually detected by monitoring the temperature of the heat transfer fluid passing out of bed 12 and out of bed 14. The pump 26 is stopped when the fluid temperature at the right hand end of bed 12 rises a prescribed amount above the initial bed temperature of about 150° F. or when the fluid temperature at the right hand end of bed 14 drops a prescribed amount below the initial bed temperature of about 550° F. This completes the process Step A leaving the major portion of bed 12 at the lower loading of about 2.5 pounds water vapor/100 pounds solid adsorbent and the major portion of bed 14 at the higher loading of about 17.5 pounds water vapor/100 pounds solid adsorbent.

To initiate the process Step B, the pump 26 is operated to circulate the heat transfer fluid in a counterclockwise direction as seen in FIG. 1. The heater 24 continues to heat the heat transfer fluid to 600° F. while the heat exchanger 25 continues to cool the heat transfer fluid to about 100° F. Because the fluid circulates in the reverse direction, the hot heat transfer fluid from heater 24 enters the right hand end of the bed 14 while the cold heat transfer fluid from the heat exchanger 25 enters the right hand end of the bed 12. At the initiation of process Step B, the bed 12 is at condenser pressure while the bed 14 is at evaporator pressure.

Figures 1, 4B:
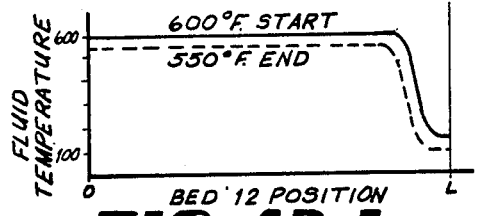
Figures 2, 4B:
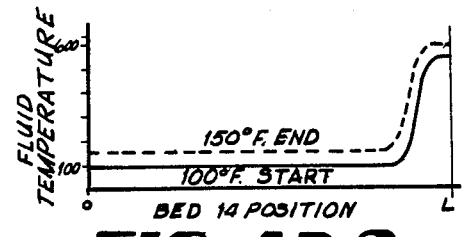

The hot heat transfer fluid from heater 24 to bed 14 starts heating the right hand end of this bed to start desorbing water vapor from the solid adsorbent at that end of the bed. Because no water vapor flows from the bed 14 to evaporator 18 due to check valve 19 or to condenser 15 due to the pressure differential, the water vapor being desorbed from the end of the bed serves to pressurize the entire bed 14. It will be appreciated that the bed 14 to the left of the thermal wave is adiabatically pressurized. As the pressure in the bed 14 is increased, the adsorbent material in the bed 14 to the left of the thermal wave tends to adsorb more refrigerant vapor throughout the bed and this adsorption releases the heat-of-adsorption from the adsorbed refrigerant to raise the temperature of that portion of the bed 14. By the time the bed 14 is pressurized to condenser pressure, the released heat-of-adsorption will have raised the temperature of that portion of the bed 14 to the left of the thermal wave in the temperature profile of bed 14 as seen in FIG. 4B-2 from 100° F. as shown by solid line to 150° F. as shown by dashed line. This increase in pressure will also cause an increase in refrigerant vapor loading from the 17.5 pounds water vapor/100 pounds solid adsorbent at 100° F. to about 18.5 pounds water vapor/100 pounds solid adsorbent at 150° F. The solid line in FIG. 4B-2 shows the profile at the beginning of Step B while the dashed line shows the profile at the end of Step B.

The heat transfer fluid passing through bed 14 is cooled to the temperature of the bed to the left of the thermal wave and thus passes out of the bed 14 to the heat exchanger 25 at this lower temperature. The heat exchanger 25 cools the heat transfer fluid down to about 100° F.

The cold heat transfer fluid entering the right hand end of bed 12 as seen in FIG. 1 starts cooling the right hand end of the bed causing it to adsorb refrigerant vapor. Because no water vapor flows into bed 12 from condenser 15 due to check valve 19 or from evaporator 18 due to pressure differential, the water vapor being adsorbed in the end of the bed serves to depressurize the entire bed 12. It will be appreciated that the bed 12 to the left of the thermal wave is adiabatically depressurized. This depressurization causes that portion of bed 12 to the left of the thermal wave to tend to desorb some of the refrigerant vapor and the heat-of-desorption therefor cools that portion of the bed to the left of the thermal wave. By the time the bed 12 is depressurized to evaporator pressure, the heat-of-desorption has cooled that portion of the bed 12 to the left of the wave in the temperature profile of bed 12 as seen in FIG. 4B-1 from about 600° F. as shown by solid line to about 550° F. as shown by dashed line. This decrease in pressure causes a decrease in refrigerant vapor loading from about 2.5 pounds water vapor/100 pounds solid adsorbent at 600° F. to about 1.5 pounds water vapor/100 pounds solid adsorbent at 550° F. The solid line in FIG. 4B-1 shows the temperature profile at the beginning of Step B while the dashed line shows the profile at the end of Step B.

At the end of process Step B, the hot bed 12 will be at evaporator pressure and with the thermal wave located at the right hand end of the bed. That portion of the bed 12 to the left of the thermal wave will be at the intermediate lower temperature of 550° F. The cool bed 14 will be at evaporator pressure with the thermal wave located at the right hand end of the bed. That portion of the bed to the left of the thermal wave will be at the lower intermediate temperature of 150° F.

Figures 1, 4C:
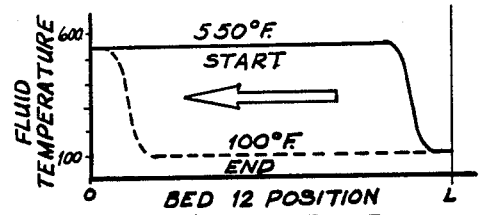
Figures 2, 4C:
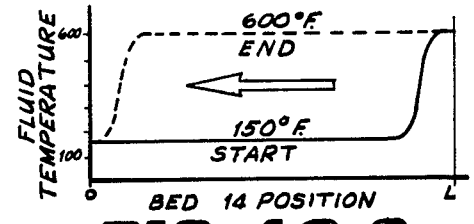

In process Step C, the pump 26 is operated to continue to circulate the heat transfer fluid in a counterclockwise direction about the heat transfer loop 11 as seen in FIG. 1. As the hot heat transfer fluid from heater 24 enters the right end of the bed, it starts heating the bed 14 up to 600° F. from that right end. The hot heat transfer fluid passing through the bed 14 will be cooled down to the initial bed temperature of about 150° F. well before the heat transfer fluid reaches the opposite end of the bed. The cooled heat transfer fluid at about 150° F. then flows through the cooling heat exchanger 25 where it is cooled down to the lower operating temperature of about 100° F. The cold heat transfer fluid enters the right end of the bed 12 through its heat exchanger 21 as seen in FIG. 1 to start cooling the bed 12 down to about 100° F. from its right end. The heat transfer fluid passing through the bed 12 will be heated up to the initial bed temperature of about 550° F. well before it reaches the opposite end of the bed. The reheated heat transfer fluid then flows back to the heater 24 where it is reheated back to the upper operating temperature of about 600° F. and recirculated around the heat transfer loop. As the pump 26 continues to circulate heat transfer fluid around the loop 11 in a counter-clockwise direction as seen in FIG. 1, the wave in the temperature profile moves lengthwise of the beds 12 and 14 from the right end thereof toward the left end. That portion of the bed 14 on the right side of the thermal wave is at about 600° F. while that portion of the bed 12 on the left side of the thermal wave is at about 150° F. as best seen in FIG. 4C-2. From FIG. 4C-1, that portion of the bed 12 on the right side of the thermal wave is at about 100° F. while that portion of the bed 12 on the left side of the thermal wave is about 550° F.

Since the bed 14 is at uniform condensor pressure during Step C, that portion of the bed 14 across which the thermal wave temperature difference is being imposed desorbs the refrigerant vapor from its initial high loading of about 18.5 pounds water vapor/100 pounds solid adsorbent at about 150° F. down to the lower loading of about 2.5 pounds water vapor/100 pounds solid adsorbent at about 600° F. That portion of the bed 14 on the left hand side of the thermal wave remains at the high loading while that portion of the bed on the right hand side of the thermal wave is at the lower loading. Thus, more and more of the water vapor in the bed 14 is desorbed as the thermal wave moves to the left and is expelled into the condenser.

Since the bed 12 is at uniform evaporator pressure during Step C, that portion of the bed 12 across which the thermal wave temperature difference is being imposed adsorbs the refrigerant vapor from its initial loading of about 1.5 pounds water vapor/100 pounds solid adsorbent at about 550° F. up to the higher loading of about 17.5 pounds water vapor/100 pounds solid adsorbent at about 100° F. That portion of the bed 12 on the left hand side of the thermal wave remains at the low loading while that portion of the bed on the right hand side of the thermal wave is at the high loading. Thus, more and more water vapor from the evaporator 18 is adsorbed in the bed 12 as the thermal wave moves to the left.

The pump 26 continues to circulate the transfer fluid counter-clockwise around the heat transfer loop 11 until the thermal waves in the beds 12 and 14 reach the left hand ends thereof as shown by the dashed line temperature profiles in FIGS. 4C-1 and 4C-2. This is usually detected by monitoring the temperature of the heat transfer fluid passing out of the beds 12 and 14. The pump 26 is stopped when the fluid temperature at the left hand end of the bed 14 rises a prescribed amount above the initial bed temperature of about 150° F. or when the fluid temperature at the left hand end of the bed 12 drops a prescribed amount below the initial bed temperature of about 550° F. This completes the process Step C leaving the major portion of the bed 14 at the lower loading of about 2.5 pounds water vapor/100 pounds solid adsorbent and the major portion of the bed 12 at the higher loading of about 17.5 pounds water vapor/100 pounds solid adsorbent.

Process Step D is initiated by operating the pump 26 to again circulate the heat transfer fluid in a clockwise direction as seen in FIG. 1. The heater 24 continues to heat the heat transfer fluid up to about 600° F. while the heat exchanger 25 continues to cool the bed transfer fluid down to about 100° F. Thus, the hot heat transfer fluid from heater 24 once again enters the left hand end of the bed 12 while the cold heat transfer fluid from the heat exchanger 25 again enters the left hand end of the bed 14. At the initiation of the process Step D, the bed 12 is normally at evaporator pressure while the bed 14 is at condenser pressure.

Figures 1, 4D:
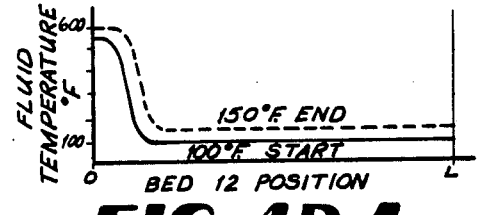
Figures 2, 4D:
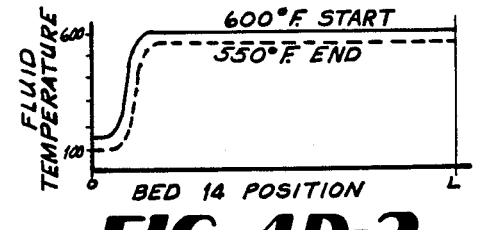

The hot heat transfer fluid from heater 24 to bed 12 starts heating the left hand end of this bed to start desorbing water vapor from the solid adsorbent at that end of the bed. Because no water vapor flows from the bed 12 to evaporator 18 due to check valve 19 or to condenser 15 due to the pressure differential, the water vapor being desorbed serves to pressurize the entire bed 12. That portion of bed 12 to the right of the thermal wave is adiabatically pressurized. As the pressure in the bed 12 is increased, the adsorbent material in that portion of the bed 12 to the right of the thermal wave tends to adsorb more refrigerant vapor and this adsorption releases the heat-of-adsorption in the adsorbed refrigerant to raise the temperature of that portion of the bed 12 to the right of the thermal wave. By the time the bed 12 is pressurized to condenser pressure, the released heat-of-adsorption will have raised the temperature of that portion of the bed 12 to the right of the wave in the temperature porfile of bed 12 as seen in FIG. 4D-1 from 100° F. as shown by solid line to 150° F. as shown by dashed line. This increase in pressure will also cause an increase in refrigerant vapor loading from the 17.5 pounds water vapor/100 pounds solid adsorbent at 100° F. to about 18.5 pounds water vapor/100 pounds solid adsorbent at 150° F. The heat transfer fluid passing through bed 12 is cooled to a temperature of the bed to the right of the thermal wave and thus passes out of the bed 12 to the heat exchanger 25 at this lower temperature. The heat exchanger 25 cools the heat transfer fluid down to about 100° F.

The cold heat transfer fluid entering the left end of bed 14 as seen in FIG. 1 starts cooling the left hand end of the bed causing it to adsorb refrigerant vapor. Because no water vapor flows into the bed 14 from condenser 15 due to check valve 19 or from evaporator 18 due to pressure differential, the water vapor being adsorbed in the end of the bed serves to depressurize the entire bed 14. That portion of the bed 14 to the right of the thermal wave is adiabatically depressurized. This depressurization causes that portion of the bed 14 to the right of the thermal wave to tend to desorb some of the refrigerant vapor and the heat-of-desorption therefor cools that portion of the bed to the right of the thermal wave. By the time the bed 14 is depressurized to evaporator pressure, heat-of-desorption has cooled that portion of the bed 14 to the right of the thermal wave in the temperature profile of bed 14 as seen in FIG. 4D-2 from about 600° F. as shown by solid line to about 550° F. as shown by dashed line. This decrease in pressure causes a decrease in refrigerant vapor loading from about 2.5 pounds water vapor/100 pounds solid adsorbent at 550° F. This completes the operation cycle of the system. At this time, the operation cycle is simply repeated.

The controller 30 monitors the heat transfer fluid temperature exiting both beds and reverses the fluid flow when the exit temperature of the heat transfer fluid shifts away from the initial bed temperature at the beginning of the process step by a prescribed amount. The exit temperature of the fluid from either bed may be used by the controller 30 to reverse the flow of the heat transfer fluid. The particular exit temperature selected will depend on the particular system operating parameters and design. The particular amount that the fluid exit temperature is allowed to shift from the initial bed temperature may be varied to suit design conditions. Typically, a value is selected which permits the bed to continue to be heated or cooled with a thermal wave effect over an extended number of cycles while at the same time maximizing the system coefficient of performance. It has been found that the thermal wave will have a positive effect on the COP with a shift in the dimensionless fluid temperature $T_f$ from its initial value at the beginning of the process step by as much as 0.5. A shift of about 0.1–0.2 in the temperature $T_f$ is typical.

When operating according to the above cycle, it is preferable that the thermal waves in both beds reach the end of the beds at the same time in process Steps A and C. If the flow of heat transfer fluid through the beds is the same, however, the traveling thermal waves may not reach the fluid exit ends of both beds at the same time. The modulating bypass valves 28 and 29 are used to individually adjust the flow of the heat transfer fluid through the beds so that the thermal waves arrive at the exit ends of the beds at about the same time. Since the amount that the exit temperature of the heat transfer fluid out of a bed has shifted with respect to the initial exit temperature at the beginning of the process step is representative of the position of the thermal wave in the bed, the controller 30 uses these values to control the valves 28 and 29. The controller 30 detects the initial exit temperatures of the heat transfer fluid out of both of the bedsat the beginning of process Step A. The controller 30 also detects the exit temperatures of the heat transfer fluid out of both of the beds at the end of process Step A and compares the initial and ending exit fluid temperatures for each bed 12 and 14 at the end of Step A. If the exit fluid temperature for one of the beds has shifted substantially more than that of the other bed, then the controller 30 adjusts the modulating bypass valves to change the heat transfer fluid flow rate through one of the beds during the following Step C to compensate for this difference. This process is repeated after Step C to adjust the fluid flow through the following Step A. The controller 30 continues this adjustment process until the controller 30 causes the bypass valve adjustment to home in on the proper bypass flow of the heat transfer fluid to achieve equal times for the heating and cooling waves to traverse their respective beds. If the thermal wave arrives first at the end of the bed being cooled, then the modulating bypass valves 28 and 29 are adjusted so that more fluid flows through the bed being heated in the next process step by bypassing a portion of the fluid from the inlet of the cooling heat exchanger 25 directly back to the inlet of the heater 24. If the thermal wave arrives first at the end of the bed heated, then the modulating bypass valves 28 and 29 are adjusted so that more fluid flows through the bed being cooled by bypassing a portion of the fluid from the inlet of the heater 24 to the inlet of heat exchanger 25.

It will also be noted that the direction of flow of the heat transfer fluid through each bed is reversed between Steps A and C. When the thermal wave is left in the exit end of the beds at the end of Steps A and C, this reversal of fluid flow through the bed permits the ends of the beds outboard of the thermal waves at the end of Steps A and C to cycle between evaporator and condenser pressures without cycling through the full temperature differential across the thermal wave. As a result, the amount of heat that is rejected by the heat exchanger 25 and added by heater 24 is minimized thus enhancing the COP of the system.

The above operating cycle description is given after the system has reached steady state operation. It will be appreciated that the first cycle in any operation will typically find the beds with a different initial temperature profile. After the initial start up cycle, however, the thermal waves should be fully developed.

Using the above criteria, a theoretical heating COP of about 3 and a theoretical cooling COP of about 2 is available. These theoretical values are based on the net heat input by the heater 24. Where the heater 24 uses a burner, the input energy to operate the system must also include the energy loss in the vented flue gases.

DESIGN CONSIDERATIONS

The creation of a thermal wave in the temperature profile in a heat exchanging device is contra to normal engineering practice where temperature gradients are minimized and typically on the order of 10° F. in the device. In the invention of this application, the thermal wave in the temperature profile in the beds 12 and 14 is maximized.

From the foregoing, it will be seen that the thermal wavelength tw must be such that a thermal wave is in fact generated in the bed. Also, the shorter the wavelength, the longer the bed can be heated or cooled without having to reverse the flow of the heat transfer fluid through the bed and the greater volume of the bed that can be cycled between the upper and lower temperatures and the less bed volume required at the ends which is not completely cycled through the temperatures.

It will also be understood that a thermal wave will be generated in both the hot transfer fluid passing through the bed and in the bed itself. While it is desirable that the two wavelengths coincide as much as possible and move axially along the length of the bed in registration with each other, the reversal of the flow of heat transfer fluid through the bed is normally based on the arrival of the thermal wave in the heat transfer fluid at the exit end of the bed in order to maximize COP. The arrival of the thermal wave is detected by monitoring the temperature of the fluid at the exit end of the bed. The fluid flow is reversed when the exit fluid temperature shifts from the initial bed temperature by the above mentioned prescribed amount.

Using conservation of energy and Fourier heat transfer laws, it has been found that the temperature profile along the bed is a function of the bed Biot number Bi, the fluid Peclet number Pe, the thermal diffusivity ratio DR between the bed and fluid and the thermal conductance ratio KA between the bed and fluid. This nomenclature is set forth in more detail in Table A at the end of the specification. Since the temperature profile is a function of these parameters, it follows that the thermal wavelength tw is also a function of these parameters. Since there is no closed form equation solution available for the temperature profile, it must be determined by numerical analysis (finite difference methods) requiring numerical values for the four non-dimensional parameters before wavelength can be found. These parameters can be further combined in a correlating parameter CP for the thermal wavelength where:

$$CP = \frac{Pe}{1 + KA} \quad (2)$$

The thermal wavelength tw can be expressed as non-dimensional wavelength TW where:

$$TW = \frac{tw}{L} \quad (3)$$

Figure 5:
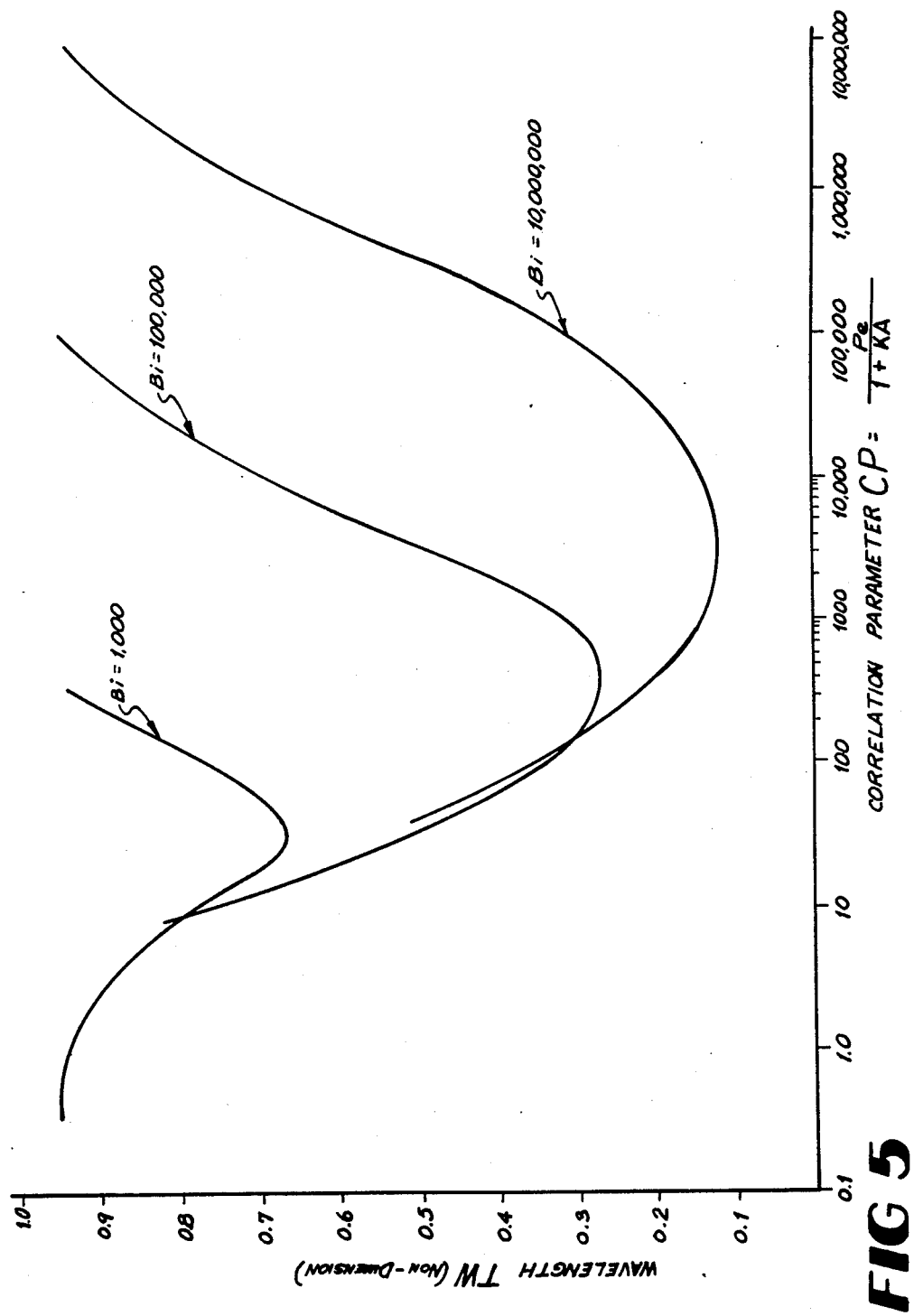
FIG. 5 is a chart correlating wavelength with the key correlating wavelength parameter.
Figure 6:
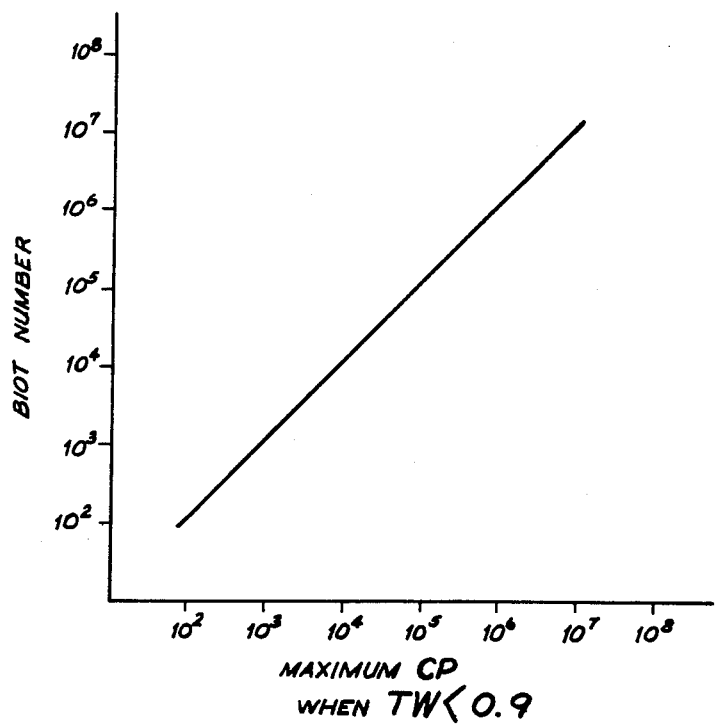
FIG. 6 is a chart correlating the maximum permissible key correlating wavelength parameter with Biot number.

The wavelength is also affected by the bed Biot number Bi. FIG. 5 is a graph showing the relationship between the dimensionless thermal wavelength TW for the thermal wave in the heat transfer fluid and the correlating parameter CP at different Biot numbers. In FIG. 5, the thermal conductance ratio KA was selected at 1,000 and the thermal diffusivity ratio was selected at 100 as representative. Plots for other values of the ratios KA and DR show curves qualitatively and quantitatively similar to those shown. FIG. 5 shows wavelength curves for Biot numbers of 1,000; 100,000 and 10,000,000. The operational efficiency of the system is affected when the dimensionless wavelength TW is 0.9 or less. From FIG. 5, it will be seen that the lower limiting value for the correlating parameter CP is one regardless of Biot number value. FIG. 5 also shows that the operating parameter CP has an upper limiting value for each Biot number where the wavelength TW is 0.9. FIG. 6 is a graph showing the relationship between Biot number Bi and correlating parameter CP at the upper limiting value of parameter CP for each Biot number. It will be seen that the upper limit of the correlating parameter CP is the Biot number value. From the foregoing it will be seen that a thermal wave is established when the correlating parameter CP is greater than one but less than the Biot number which can be expressed as:

$$1 < CP < Bi \quad (4)$$

Reference to FIG. 5 shows that there is also an optimum value for the correlating parameter CP at each value of Biot number which produces the shortest dimensionless thermal wavelength. This optimum value of the parameter CP has been found to be the square root of the Biot number being used. FIG. 5 also demonstrates that the minimum dimensionless thermal wavelength TW which can be achieved decreases with increasing values of Biot number. Therefore, the Biot number should be maximized for each design.

In the actual system design, it will be seen that the non-dimension parameters Bi, Pe, DR and KA are effected by the refrigerant and adsorbent selected, the bed heat exchanger design and the velocity of the heat transfer fluid through the bed heat exchanger. Typically, the refrigerant and adsorbent are first selected and then the fluid velocity and heat exchanger design generated to meet the design criteria. While different heat exchanger designs and fluid velocities can be used for any selected refrigerant and adsorbent, the following example sets out one heat exchanger design and fluid velocity which falls in the system design criteria for a selected adsorbent and refrigerant.

This example incorporates a shell and tube type heat exchanger design for the bed heat exchangers 21 and 22 where the heat transfer fluid passes through the tubes. Using water as the refrigerant and zeolite as the adsorbent, the following design variables were selected:
Bed length L=6 feet
Tube material=stainless steel
Tube diameter=0.25 inch
Tube wall thickness=0.01 inch
Distance between adjacent tubes=0.15 inch
Heat transfer fluid flow rate=0.3 gpm This selection produces the following values for the non-dimensional parameters:
Bi=56,882
Pe=56,416
DR=6.7
KA=27.56

The correlating parameter CP thus is calculated to be about 1,992. The dimensionless thermal wavelength TW is calculated to be about 0.46 and thus allows a thermal wave to be generated in the operating system. To operate the system so that the fluid flow through the beds is reversed as soon as the heat transfer fluid exit temperature out of the bed being heated starts rising significantly above the initial bed temperature gives a system cycle time of about 1.4 hours.

Where the number of tubes in the bed heat exchanger is selected at 300, the bed mass is 129 pounds adsorbent/bed, the upper operating temperature is 600° F., the lower operating temperature is 100° F., the condenser temperature is 100° F., the evaporator temperature is 40° F. and the air temperature at the evaporator is 70° F., the operating COP can be calculated. The heating COP is calculated at about 2.6 while the cooling COP is about 1.6. This is assuming that the heat transfer fluid flow in the beds will be reversed as indicated above.

Definitions $$Bi = \frac{hPL^2}{k_b A_z}$$

$$DR = \frac{d_b}{d_f}$$

$$Pe = \frac{\rho_f c_f L V}{k_f}$$

-continued $$KA = \frac{k_b A_z}{k_f A_f}$$

$h =$ fluid to tube convective heat transfer coefficient in bed heat exchanger $P =$ inside wetted perimeter of cross-section of tube in bed heat exchanger $L =$ bed length $k_b =$ effective axial thermal conductivity of bed including bed heat exchanger $A_z =$ cross-sectional area of adsorbent to which single bed heat exchanger tube exposed $d_b =$ effective thermal diffusivity of bed including bed heat exchanger $d_f =$ fluid thermal diffusivity $\rho_f =$ fluid density $c_f =$ fluid specific heat capacity $V =$ fluid velocity in tubes of heat exchanger $k_f =$ fluid thermal conductivity $A_f =$ cross-sectional area of fluid in tube in bed heat exchanger

I claim:

1. A method of operating a heat pump system between an upper operating temperature and a lower operating temperature comprising two solid adsorbent beds connected to the condenser and evaporator in a heat pump circuit so that desorbed refrigerant can flow from the bed by being heated into the condenser and refrigerant from the evaporator can flow into the bed being cooled comprising the steps of:
(a) placing a separate heat exchanger in a heat transfer relationship with each bed and connecting the heat exchangers in series with each other in a closed fluid loop so that heat transfer fluid flows around the closed loop serially through the heat exchangers;
(b) heating the heat transfer fluid passing between one of the ends of the beds to the upper operating temperature;
(c) cooling the heat transfer fluid passing between the other ends of the beds to the lower operating temperature;
(d) circulating the heat transfer fluid around the closed fluid loop serially through the heat exchangers so that the heat transfer fluid passes generally lengthwise of both beds where the circulation rate of the heat transfer fluid is such that the heated heat transfer fluid passing into the end of the bed heats the solid adsorbent bed from an initial cool bed temperature in the vicinity of the lower operating temperature while the bed cools the heat transfer fluid from the upper operating temperature down to about the initial cool bed temperature in a distance less than the length of the bed and with the cooled heat transfer fluid passing into the end of the other bed cooling the solid adsorbent bed from an initial hot bed temperature in the vicinity of the upper operating temperature while the bed heats the heat transfer fluid from the lower operating temperature up to about the initial hot bed temperature in a distance less than the length of the bed;

(e) when the exit temperature of the heat transfer fluid passing out of either of the beds shifts from the initial temperature of that bed by a prescribed amount less than about fifty percent (50%) of the difference between the initial bed temperature and inlet fluid temperature in step (b), changing the circulation of the heat transfer fluid so that the heated heat transfer fluid passes through the cooled bed and the cooled heat transfer fluid passes through the heated bed; and (f) when the exit temperature of the heat transfer fluid passing out of either of the beds shifts from the initial temperature of that bed by said prescribed amount in step (c), changing the circulation of the heat transfer fluid to step (b) to cycle the beds between the upper and lower operating temperatures.

2. The method of claim 1 wherein the heat transfer fluid is serially circulated through the beds in a first direction lengthwise of the beds during step (b) and in the opposite direction during step (c).

3. The method of claim 1 wherein the initial bed temperature of each of the beds during heating is the temperature to which the bed is raised from the lower operating temperature by pressurizing the bed from evaporator pressure to condenser pressure and the initial bed temperature of each of the beds during cooling is the temperature to which the bed is lowered from the upper operating temperature by depressurizing the bed from condenser pressure to evaporator pressure.

4. The method of claim 1 further including the step of configuring the beds and heat exchangers so that the correlation parameter of the fluid Peclet number of the fluid passing through each bed divided by one plus the thermal conductance ratio of the solid adsorbent bed with the heat transfer fluid passing through the bed is greater than one and less than the bed Biot number.

5. The method of claim 4 wherein the step of configurating the beds further includes configuring the beds and heat exchangers so that the correlation parameter is substantially equal to the square root of the Biot number.

6. The method of claim 1 further including the step of individually adjusting the volumetric flow rate of the heat transfer fluid flowing through each of said beds so that the exit temperature of the heat transfer fluid passing out of both beds shifts from the initial temperature of that bed by the prescribed amount in about the same length of time.

7. A heat pump system comprising:
a pair of solid adsorbent beds;
a heat pump circuit connected to said solid adsorbent beds so that said heat pump circuit is driven in response to the heating and cooling of said beds;
a heat transfer fluid;
a pair of bed heat exchange means, one of said bed heat exchange means operatively associated with each of said beds so that the heat transfer fluid passing through each of said heat exchange means passes lengthwise of said bed associated therewith in a single pass and each of said heat exchange means having opposed ends;
heating means adapted to heat said heat exchange fluid to a prescribed upper operating temperature connecting one of the ends of both of said bed heat exchange means;

cooling means adapted to cool said heat exchange fluid to a prescribed lower operating temperature connecting the other of the ends of both of said bed heat exchange means so that said heat transfer fluid can flow serially from said heating means, through one of said bed heat exchange means, through said cooling means, through the other of said bed heat exchange means and back to said heating means to define a heat transfer circuit;

circulation means for alternatively circulating said heat transfer fluid in one direction around the heat transfer circuit so that one of said beds is cooled while the other of said beds is heated, and in the alternate direction around the heat transfer circuit so that said other of said beds is cooled while said one of said beds is heated where the circulation rate of the heat transfer fluid is such that the heated heat transfer fluid passing into the end of one of said heat exchange means heats said solid adsorbent bed associated therewith from an initial cool bed temperature in the vicinity of the lower operating temperature while said bed cools the heat transfer fluid from the upper operating temperature down to about the initial cool bed temperature in a distance less than the length of said bed and with the cooled heat transfer fluid passing into the end of the other of said heat exchanger means cooling said solid adsorbent bed associated therewith from an initial hot bed temperature in the vicinity of the upper operating temperature while said bed heats the heat transfer fluid from the lower operating temperature up to about the initial hot bed temperature in a distance less than the length of the bed in order for heat exchanged between said heat transfer fluid and each of said beds to generate a thermal wave in the temperature profiles lengthwise of said beds moving through each of said beds; and control means operatively associated with said heat transfer fluid passing out of said beds and with said circulation means to cause said circulation means to reverse the circulation direction of said heat transfer fluid around said heat transfer circuit when either of the thermal wave reaches that end of said bed from which said heat transfer fluid exits.

8. The heat pump system of claim 7 wherein each of said bed heat exchange means is constructed and arranged so that the correlation parameter of the fluid Peclet number of said heat transfer fluid passing through each of said bed heat exchange means divided by one plus the thermal conductance ratio of said solid adsorbent bed with said heat transfer fluid is greater than one and less than the bed Biot number.

9. The heat pump system of claim 8 wherein each of said bed heat exchange means is constructed and arranged so that said correlation parameters is about the same value as the square root of said bed Biot number.

10. The heat pump system of claim 8 wherein said control means is constructed and arranged to reverse the circulation direction of said heat transfer fluid in said heat transfer circuit when the temperature of said heat transfer fluid exiting either of said beds changes a prescribed amount less than about fifty percent (50%) of the difference between the temperature of said bed when said heat transfer fluid circulation direction was last reversed and the temperature of the heat transfer fluid entering the bed.

11. The heat pump system of claim 7 further including by-pass means connecting the common point between one of said bed heat exchange means and said cooling means with the common point between the other of said bed heat exchange means and said heating means; and connecting the common point between the other of said bed heat exchange means and said cooling means with the common point between one of said bed heat exchange means and said heating means, said control means operatively connected to said by-pass means to cause said by-pass means to adjust the flow of said heat transfer fluid through said bed heat exchange means so that the thermal waves reach the ends of both of said beds from which said heat transfer fluid exits at about the same time.

* * * * *